Feb. 6, 1951 J. H. WIGGINS 2,540,801
SECONDARY SEAL FOR FLOATING TANK ROOFS
Filed Dec. 3, 1945

INVENTOR;
JOHN H. WIGGINS
BY Wells L. Church
ATTORNEY

Patented Feb. 6, 1951

2,540,801

UNITED STATES PATENT OFFICE 2,540,801

SECONDARY SEAL FOR FLOATING TANK ROOFS

John H. Wiggins, Chicago, Ill.

Application December 3, 1945, Serial No. 632,408

2 Claims. (Cl. 220—26)

This invention relates to secondary seals for floating tank roofs of the general type that comprises a wiper or equivalent, contacting element for the tank side wall, arranged above the top edge of the annular side wall shoe of the primary sealing structure and mounted on radially-movable supports or carriers attached to the side wall shoe and projecting upwardly from same.

One object of my present invention is to provide a secondary seal of the general type mentioned, in which the radially-movable supports or carriers on the side wall shoe that sustain the wiper or tank wall contacting element, are so constructed and arranged that gravity is relied upon to move said carriers outwardly in a direction to hold the wiper pressed against the inner face of the tank side wall, and means is provided for preventing said radially-movable supports or carriers from moving inwardly and assuming such a position that the wiper will not function properly.

Another object is to provide a secondary seal of the general type mentioned, which is of such design or construction that in the event the annular side wall shoe moves upwardly, into a position in which the wiper is disposed above the top edge of the tank side wall, a high wind cannot cause the supports or carriers for the wiper to assume such a position that when the side wall shoe subsequently moves downwardly, the wiper will not engage or bear upon the tank side wall.

And still another object of my invention is to provide a secondary seal of the general type mentioned, which is of such design or construction that the supports or carriers for the side wall wiper can never assume a position in which they cause injury to the flexible, curtain-like element that bridges the gap between the wiper and the top edge of the annular side wall shoe.

Figure 1:
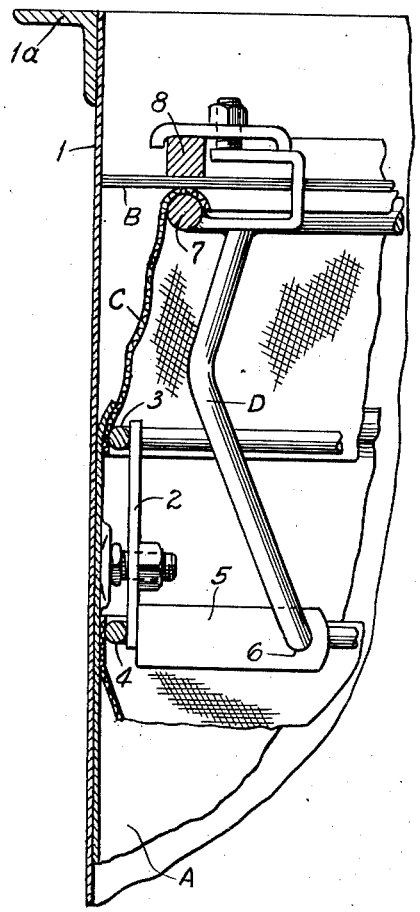
Figure 2:
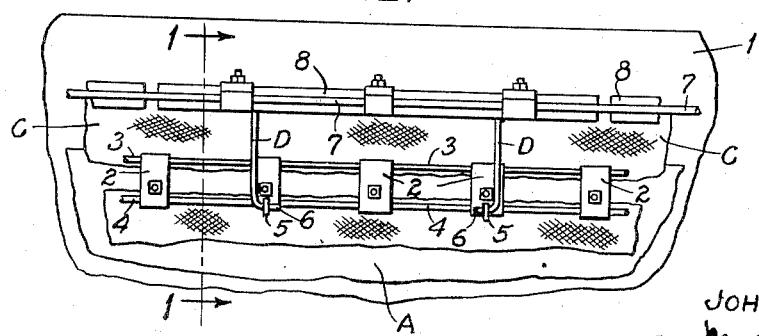

Figure 1 of the drawings is a vertical sectional view, illustrating a secondary seal for floating tank roofs, constructed in accordance with my present invention, said view being taken on the line 1—1 of Figure 2.

Figure 3:
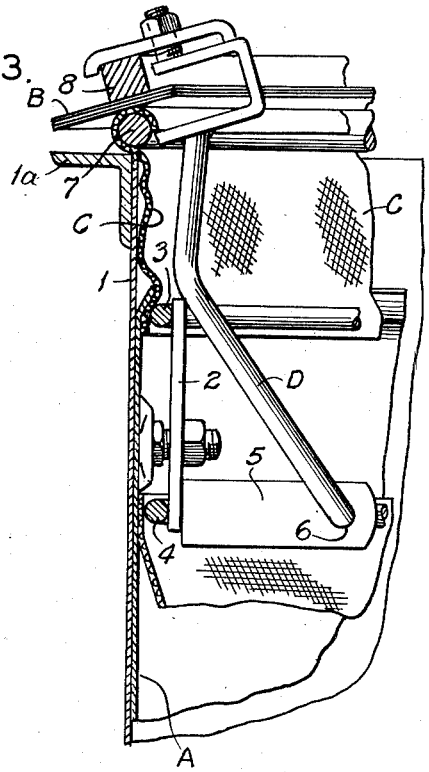

Figure 2 is a fragmentary elevational view of said secondary seal, looking outwardly from the center of the roof on which the seal is used; and Figure 3 is a view similar to Figure 1, showing the annular shoe of the primary sealing structure at the upper end of the tank side wall, with the wiper of the seal located at a point above the top edge of the tank side wall.

I have herein illustrated my present invention applied to a secondary seal, whose co-acting parts are of the specific design and general arrangement disclosed in my pending application Serial No. 542,046, filed June 26, 1944, now Patent No. 2,427,171 but I wish it to be understood that my present invention is applicable to any kind of a floating tank roof sealing structure that comprises an annular shoe carried by the roof and arranged in sliding engagement with the side wall of the tank, a wiper or auxiliary contacting element for the tank side wall, arranged above the top edge of said shoe, a flexible, curtain-like element depending from the wiper and attached to the top edge portion of the annular side wall shoe, so as to bridge the gap between said parts, and radially-movable supports or carriers on the annular shoe that support said wiper and flexible, curtain-like element.

In the accompanying drawings, which illustrate one form of my present invention, the reference character A designates the annular shoe of a conventional floating tank roof sealing structure which is mounted on the roof in such a way that when the roof rises and falls, said shoe is maintained in sliding engagement with the inner face of the side wall 1 of the tank, B designates the wiper or tank wall contacting element of the secondary seal that is arranged above the top edge of the side wall shoe A, C designates a flexible, curtain-like element extending downwardly from the wiper B and attached to the top edge portion of the side wall shoe A, and D designates a plurality of radially-movable supports or carriers on the side wall shoe that support the wiper B and the flexible, curtain-like element C that bridges the gap between the wiper and the top edge portion of the side wall shoe A. The carriers D are herein illustrated as rockable members that are of such construction and which are pivotally mounted on the side wall shoe A in such a manner, that gravity tends to move the upper end portions of said carriers outwardly towards the tank side wall 1, and exert just enough pressure on the wiper B to snugly hold said wiper against the tank side wall, and the means that is used to prevent the supports or carriers for the wiper B from assuming such a position that the wiper will not function properly with the tank side wall, consists of the previously mentioned flexible, curtain-like element C that bridges the gap between the wiper and the top edge portion of the side wall shoe.

In specific design, the structure herein shown is similar to the structure shown in my previously mentioned pending application, i. e., it comprises a plurality of clamping plates 2 on the inner side of the side wall shoe A that act on clamping rings 3 and 4 which are used to connect the curtain-like element C, and a flexible, primary seal to the side wall shoe, inwardly-projecting lugs 5 on the clamping plates 2 that form supports or bearings for rockable carriers D formed by vertically-disposed rods whose lower ends are bent laterally to form pintles or rock shafts 6 positioned in holes in the lugs 5, and coacting, horizontally-disposed clamping devices 7 and 8 mounted on the upper end portions of the rockable carriers D so as to support and connect together the side wall wiper B and the flexible-curtain-like element C that extends downwardly from said wiper to the upper end portion of the side wall shoe A.

The principal distinguishing characteristic between my improved structure shown herein and the structure shown in my pending application Serial No. 542,046, filed June 26, 1944, is that no springs are used in my improved structure to exert pressure on the carriers for the wiper B in a direction to move said carriers outwardly and press said wiper against the tank side wall, and the pivots or axes of movement of said carriers are so arranged that gravity is utilized to cause said carriers to press the wiper B outwardly into snug engagement with the tank side wall; the flexible, curtain-like element C is so constructed, designed and arranged that it performs the additional function of a stay to prevent the wiper B from moving inwardly or away from the tank side wall into an inoperative position with relation to said wall; and the rockable carriers D for the wiper are so designed that even when the side wall shoe A moves upwardly into such a position as to cause the wiper B to be located above the top edge of the tank side wall, the carriers D cannot contact with, and perchance, cause injury to the flexible, curtain-like element C. Thus, as shown in Figure 1 of the drawings, the lugs or inwardly-projecting supports 5 on the side wall shoe, in which the carriers D are pivotally mounted, are made of such length that the pivots or axes of movement of the carriers D are located a considerably greater distance inwardly from the tank side wall than the clamping devices 7 and 8 at the upper ends of the carriers, thereby causing the weight of said clamping devices 7 and 8 to exert a force or load on the carriers that thrusts the upper ends of the carriers outwardly, whereby gravity causes the carriers to naturally assume a position in which they lean outwardly and exert just enough pressure on the wiper to hold it against the tank side wall. To state it in another way, the pintles or pivots 6 at the lower ends of the rockable carriers D are spaced inwardly from the shoe A a distance great enough to cause the clamping devices 7 and 8 at the upper ends of the carriers to be located considerably to the left of the pivots of the carriers D (looking at Figure 1), with the result that when the wiper B is in engagement with the tank side wall, or is located above the top edge of said wall, the clamping devices 7 and 8 lie in a vertical plane intermediate the tank side wall and the pivots of the carriers, and thus counteract any tendency of the carriers to swing inwardly away from the tank side wall.

In the normal functioning of a floating tank roof, there are times when the side wall shoe A moves upwardly into such a position that the wiper B of the secondary seal is located above the top edge of the tank side wall, as shown in Figure 3. In order to guard against the possibility of a high wind acting on the wiper B and the exposed portion of the curtain-like element C, exerting pressure on said parts in a direction tending to cause the carriers D to rock inwardly (away from the tank side wall) into such a position that the wiper will not properly engage the tank wall when the side wall shoe A subsequently moves downwardly, I make the curtain-like element C of such depth or height that it will function as a stay to limit the inward swinging movement of the carriers D and prevent the clamping devices 7 and 8 at the upper ends of the carriers from moving inwardly beyond the vertical plane in which the pivots of the carriers D lie. Thus, it will be seen that in my improved structure gravity instead of springs is used to hold the wiper B in snug engagement with the tank side wall, and a means, to wit, the flexible, curtain-like element C is provided for preventing the carriers D from assuming such a position that the wiper B will not function properly with the tank side wall. Usually, the side wall of an oil storage tank is provided at its top edge with an angle $1^a$ that extends circumferentially around said wall. In order to eliminate the possibility of the carriers D exerting pressure on the flexible, curtain-like element C, and perchance, cutting or damaging the same when the wiper B is disposed in a position above the top edge of the tank side wall, as shown in Figure 3, I construct the carriers D in the form of substantially elbow-shaped levers so that when the wiper B moves upwardly above the top edge of the tank side wall, the clamping plates 2 on the side wall shoe will function as stops to limit the outward swinging movement of the carriers D and cause the angularly-disposed upper end portions of the carriers to be maintained in spaced relationship with the flexible, curtan-like element C, as shown in Figure 3. Consequently, even though the curtain-like element C bears against the angle $1^a$ at the top edge of the tank side wall when the wiper B is in the position shown in Figure 3, no injury will result to the flexible element C because of the very slight pressure per linear inch on the element C, and because there is no possibility of the element C being pinched or clamped between the angle $1^a$ and the carriers D.

Having thus described my invention, what I claim as new and desire to secure by Letters Patent is:

1. In a secondary seal for floating tank roofs, the combination of a side wall shoe, a wiper disposed so as to normally engage the inner face of the tank side wall at a point above the top edge of said shoe, rockable carriers for said wiper projecting above the top edge of the shoe, clamping devices at the upper ends of the carriers for attaching the wiper to the carriers, pivots that connect the carriers to said shoe, said pivots being disposed far enough inwardly from the shoe to cause the said clamping devices to normally lie in a vertical plane between the shoe and the said pivots of the carriers, whereby the carriers naturally assume an outwardly-inclined position and cause the wiper to normally be maintained in engagement with the tank side wall, and a flexible, curtain-like element attached to the top edge of the shoe and to the upper end portions of said carriers for bridging the gap between the wiper and the shoe, said curtain-like element being of such length or vertical height that in the event wind pressure causes the carriers to rock inwardly when the wiper is disposed in a zone above the top edge of the tank side wall, said curtain-like element will act as a stay that prevents the carriers from swinging inwardly past the pivots of the carriers, into a position wherein the wiper will not properly engage or co-act with the tank side wall when said wiper subsequently moves downwardly into the zone of said wall.

2. A structure of the kind described in claim 1, in which the side wall shoe is provided with stops disposed so that when the wiper is located above the top edge of the tank side wall, the carriers bear against said stops and thus are prevented from moving outwardly into a position where said curtain-like element will be pinched between the tank side wall and the carriers.

JOHN H. WIGGINS.

REFERENCES CITED

The following references are of record in the file of this patent:

UNITED STATES PATENTS

| Number | Name | Date |
| --- | --- | --- |
| Re. 22,169 | Hammeren | Sept. 1, 1942 |
| 1,660,021 | Wiggins | Feb. 21, 1928 |
| 1,668,792 | Wiggins | May 8, 1928 |
| 2,302,904 | Wiggins | Nov. 24, 1942 |
| 2,318,135 | Wiggins | May 4, 1943 |
| 2,354,629 | Wiggins | July 25, 1944 |